United States Patent [19]

Kuchuk-Yatsenko et al.

[11] Patent Number: 4,725,707
[45] Date of Patent: Feb. 16, 1988

[54] FLASH-BUTT RESISTANCE WELDING PROCESS

[76] Inventors: Sergei I. Kuchuk-Yatsenko, prospekt 40-letia Oktyabrya, 2I, kv. 93; Mikhail V. Bogorsky, ulitsa Ozernaya, 30, kv. I20; Valery G. Krivenko, ulitsa Ordzhonikidze, 3, kv. 35; Daniil I. Belyaev, ulitsa Cheshskaya, 4, kv. I4I; Sergei M. Samotryasov, ulitsa Semenovskaya, 9, kv. 4I, all of, Kiev, U.S.S.R.

[21] Appl. No.: 943,041

[22] Filed: Dec. 18, 1986

[51] Int. Cl.⁴ .............................................. B23K 11/04
[52] U.S. Cl. ..................................... 219/100; 219/104
[58] Field of Search .................. 219/97, 100, 101, 104

[56] References Cited

U.S. PATENT DOCUMENTS 3,748,430  7/1973  Deffenbaugh ..................... 219/97

FOREIGN PATENT DOCUMENTS 984296  6/1965  United Kingdom .
226745  7/1968  U.S.S.R. .

OTHER PUBLICATIONS

B. D. Orlov "Technology and Equipment of Resistance Welding", Mashinostroyenie, Moscow, 1976, p. 90, FIG. 3.8a (no translation).

Primary Examiner—Clifford C. Shaw
Attorney, Agent, or Firm—Lilling & Greenspan

[57] ABSTRACT

A flash-butt resistance welding process including a flashing of parts being welded and their upsetting. The direction of speed of motion of the parts during flashing is changed by converging and diverging them. The parts being welded are converged up to the moment when the total resistance of elementary contacts arising between the flashed surfaces of the parts becomes equal to 0.4–0.5 of the short-circuit impedance of the welding machine. Then the parts are diverged up to the moment when the summary resistance of elementary contacts reaches 1.4–1.6 of the short-circuit impedance of the welding machine.

1 Claim, 2 Drawing Figures

FLASH-BUTT RESISTANCE WELDING PROCESS

BACKGROUND OF THE INVENTION

1. Field of the Invention

The present invention relates to butt resistance welding and, more particularly, to a flash-butt resistance welding process. The invention can be successfully utilized for welding thick-walled or large compact parts on machines for flash-butt resistance welding.

2. Description of the Prior Art

Known in the prior art is a flash-butt resistance welding process in which the first stage of the welding process includes heating of parts by the welding current. The parts are preheated by the resistance method involving intermittent current pulses. The current is interrupted either by opening of the welding circuit by reciprocating motion of one of the parts being welded or by periodic disconnection of the primary winding of the transformer from the power mains (UK Pat. No. 984,296, Cl.B23K, 1965). In this welding process the parts are periodically brought together to form steady contact between their touching surfaces then spread apart until the welding circuit is opened.

However, the known process fails to ensure uniform heating of parts throughout their section and a high quality of the welded joint.

Also known in the prior art is a flash welding process without preheating in which the motion speed of the parts being welded is periodically and momentarily raised (USSR Inventor's Certificate No. 226745, Cl.H05B, 1968). As this speed is increased, the number of elementary contacts between the flashed butt ends of the parts grows sharply while on reduction of this speed the number of contacts diminishes and stays at the previous level for some time. The changes of speed are corrected in such a way that after raising the current intensity to a certain value the speed begins to be reduced to the initial level thereby avoiding short circuits between the butt ends of parts. However, it proves practically impossible to avoid opening of the welding circuit on reduction of speed which causes pauses in the flashing process. This extends the welding time and, consequently, reduces the output of the welding machine.

SUMMARY OF THE INVENTION

An object of the invention resides in conducting the flashing process at high values of useful electric power without intervals in the current flow and without short circuits between the parts being welded, which would cut down the welding time.

The essence of the invention lies in a flash-butt resistance welding process that includes a flashing and an upsetting of parts, the direction of speed of motion of the flashed parts being changed by bringing them together and spreading them apart. According to the invention, the flashing of the parts is accompanied by measuring the total resistance of the elementary contacts arising between the flashed surfaces of the parts being welded, comparing the total resistance of the elementary contacts with the short circuit impedance of the welding machine and bringing together the parts being welded up to the moment when the total resistance of the elementary contacts reaches the value equal to 0.4–0.5 of the short circuit impedance of the welding machine. Then the parts are spread apart up to the moment when the total resistance of elementary contacts reaches 1.4–1.6 of the short-circuit impedance of the welding machine.

The herein-proposed invention provides for stepping up the welding efficiency and intensifies the heating of the flashed parts by reducing the interruptions in the current flow. Besides, the process of flashing is conducted under the conditions approaching those characterized by a maximum useful power.

BRIEF DESCRIPTION OF THE DRAWINGS

Now the invention will be described by way of example with reference to the accompanying drawings in which.

DESCRIPTION OF THE PREFERRED EMBODIMENT

Figure 1:
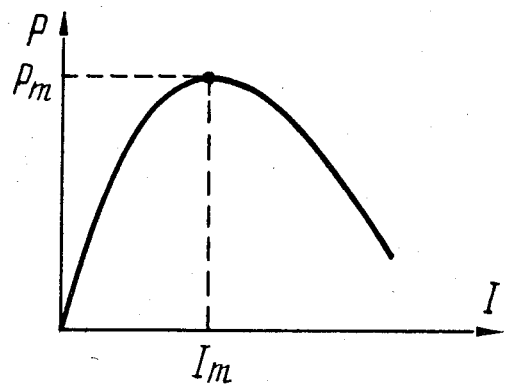
FIG. 1 shows the dependence of the useful power P of a welding machine on a welding current I according to the invention.

It is well known that the dependence of the useful power P of a welding maching upon a welding current I can be represented as shown in FIG. 1 (cf. B. D. Orlov "Technology and Equipment of Resistance Welding", Mashinostroyenie", Moscow, 1975, p. 90, FIG. 3.8a). A maximum useful power $P_m$ corresponds to a current $I_m$ when the summary resistance of elementary contacts is equal to the short circuit impedance of the machine. From the standpoint of power expenditures it is expedient that the flashing process be conducted at the maximum useful power $P_m$.

Investigations of the butt welders with various short-circuit impedances have proved that steady flashing without short circuits and interruptions in the current flow can be ensured when the total resistance of the elementary contacts is maintained from 0.4–0.5 to 1.4–1.6 of the short circuit impedance of the welding machine.

The ideal flashing conditions are the conditions under which the total resistance of elementary contacts is equal to the short circuit impedance of the welding machine. The existing speed of response of the actuating drives of butt welders fails to ensure the ideal flashing conditions characterized by the above-stated equality.

The selection of the minimum limiting summary resistance of elementary contacts which is 0.4–0.5 of the short circuit impedance is attributed to the fact that a further reduction of the total resistance of elementary contacts results in a substantial reduction of the useful power of the welding machine which may result in the short circuiting of the parts being welded.

The selection of the maximum limiting total resistance of elementary contacts at 1.4≠1.6 of the short circuit impedance of the machine is due to the fact that a further increase in the total resistance of elementary contacts results in a sharp reduction of their number and there appears a risk of objectionable interruptions in the welding current flow.

The herein-proposed process consists in that after turning on the voltage, the parts to be welded begin to converge at a preset speed. As the parts come closer to each other, there appear elementary contacts between the flashed surfaces and the number of such contacts grows. This is accompanied by measurement of an electric parameter, i.e. the total resistance of elementary contacts. The increase of the number of elementary contacts reduces their total resistance. When this resistance drops to 0.4–0.5 of the short circuit impedance of the machine, the short-circuiting of the parts being welded is prevented by changing the direction of speed of their motion, i.e. said parts begin to be drawn apart at a preset speed. This divergence is continued until the reduction of the number of elementary contacts brings their total resistance to 1.4–1.6 of the short circuit impedance of the welding machine. This ensures a constant current flow through the parts being welded.

To make the herein-proposed method more apparent, given below is and example of its embodiment.

EXAMPLE

The machine for flash-butt resistance welding with the short circuit impedance of $90 \cdot 10^{-6}$ Ohms was used for welding railway rails at a welding voltage of 8 V. The rails were drawn together at a speed of $1 \cdot 10^{-3}$ m/s. When the total resistance of the elementary contacts arising between the flashed surfaces of rails reached $40 \cdot 10^{-6}$ Ohms, the rails were diverged at a speed of $0.5 \cdot 10^{-3}$ m/s. As the rails were drawn apart, the summary resistance of the elementary contacts grew and, as it reached $130 \cdot 10^{-6}$ Ohms, the parts were again brought closer to each other.

Figure 2:
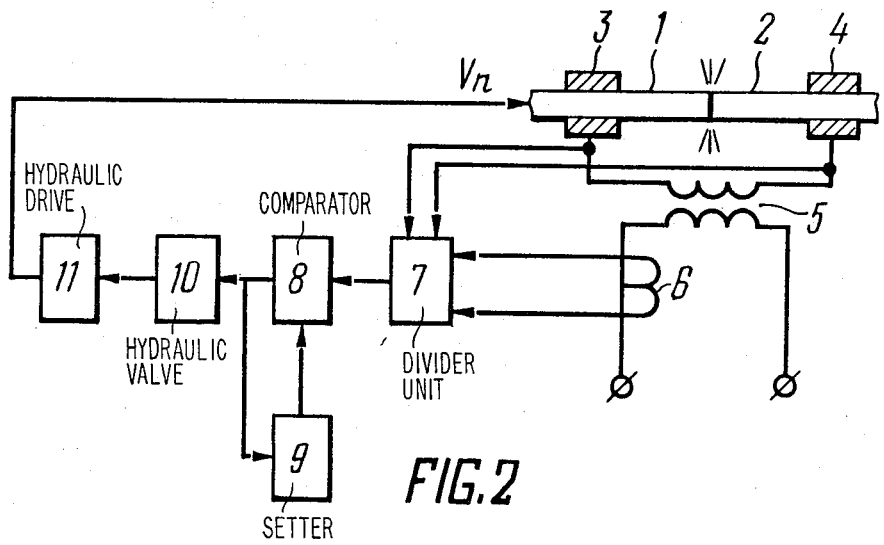
FIG. 2 is a block diagram of an apparatus for the realization of the flash-butt resistance welding process according to the invention.

An apparatus for realizing the flash-butt resistance welding process is illustrated by the block diagram in FIG. 2.

Parts 1 and 2 (FIG. 2) being welded are clamped in welding dies 3 and 4 to which a secondary winding of a welding transformer 5 is connected. A primary winding of the transformer 5 is connected to an instrument current transformer 6 whose output is connected to one of the inputs of a divider unit 7. A second input of the divider unit 7 is connected with the dies 3 and 4 and its output is connected to one of the inputs of a comparator 8 whose other input is connected to a setter 9. An output of the comparator 8 is connected to an input of a solenoid-operated hydraulic valve 10 and with a control input of the setter 9. The solenoid-operated hydraulic valve 10 is connected with a hydraulic drive 11, the latter being operatively associated with the die 3.

The apparatus functions as follows.

At the initial moment of welding, the setter 9 (FIG. 2) shapes a signal with a voltage level corresponding to the total resistance of elementary contacts which is 0.4–0.5 of the short-circuit impedance of the welding machine while the comparator 8 shapes a signal for converging the parts 1 and 2. Being actuated by this signal, the solenoid-operated hydraulic valve 10 and the hydraulic drive 11 bring the parts 1 and 2 closer together at a speed proportional to the value of the signal by the comparator 8.

At the same time, the voltage is applied to the parts 1 and 2 from the welding transformer 5 via the dies 3 and 4. With the appearance of welding current, a signal is generated at the output of the current transformer 6 and delivered to one of the inputs of the divider unit 7. The second input of the divider 7 receives an alternate signal corresponding to the voltage on the portions of the parts 1 and 2 between the dies 3 and 4. If we neglect the voltage drop on the portions of the parts 1 and 2 caused by the current flow, this signal can be regarded as a voltage drop in the spark gap between the flashed butt ends of the parts 1 and 2. The signal picked off the dies 3 and 4 is divided in the divider unit 7 on a certain scale by the signal coming in from the current transformer 6.

As a result, the signal shaped at the output of the divider unit 7 is proportional to the quotient of the division of voltage by current, i.e. proportional to the total resistance of elementary contacts. Then the output signal is fed from the divider unit 7 to one of the inputs of the comparator 8 whose second input receives a signal from the setter 9 proportional to the short circuit impedance of the welding machine. In this case the proportionality factor and, consequently, the value of the signal at the output of the setter 9 are determined by the polarity of the output signal of the comparator 8, i.e. by the direction of motion of the parts 1 and 2 being welded. Thus, when the parts 1 and 2 are being converged (a positive signal at the output of the comparator 8), the signal level at the output of the setter 9 corresponds to the total resistance of elementary contacts which is 0.4–0.5 of the short circuit impedance of the welding machine. When the parts 1 and 2 are being drawn apart (a negative signal at the output of the comparator 8) this signal level corresponds to the total resistance of elementary contacts which is 1.4–1.6 of the short circuit impedance of the welding machine.

If, with the gradually converging parts 1 and 2, the voltage level of the signal fed from the divider unit 7 to the input of the comparator 8 is higher than 0.4–0.5 of the short circuit impedance of the machine, the parts 1 and 2 continue converging at the preset speed. When the signal level at the output of the divider unit 7 reaches the value corresponding to 0.4–0.5 (or lower than 0.4) of the short-circuit impedance of the machine, the comparator 8 will generate a negative signal ensuring the divergence of the parts 1,2 at the preset speed. In this case the total resistance of elementary contacts will begin growing. However, the parts 1 and 2 continue to be spread apart even after the value of the summary resistance of elementary contacts rises above 0.5 of the short circuit impedance of the welding machine. This should be attributed to the fact that during divergence of the parts 1 and 2, the input of the setter 9 receives a negative signal from the output of the comparator 8, so that the output of the setter 9 generates a signal of the level corresponding to the total resistance of elementary contacts equal to 1.4–1.6 of the short-circuit impedance of the welding machine.

When the parts 1 and 2 are being diverged and the total resistance of elementary contacts reaches a value equal to 1.4–1.6 of the short-circuit impedance of the machine (or grows even higher), a positive signal is generated from the output of the comparator 8 which ensures convergence of the parts 1,2. This changes the proportionality factor of the setter 9 and the voltage level established at its output corresponds to the total resistance of elementary contacts equal to 0.4–0.5 of the short-circuit impedance of the welding machine.

Thus, the disclosed invention permits butt resistance welding to be conducted at a high useful power without any interruptions of the current flow and without short circuiting of the parts 1,2 being welded. This intensifies the heating of welded parts 1,2 and cuts down the welding time.

The positive effect is attained due to maintaining, in the course of flashing, the total resistance of elementary contacts ranging from 0.4–0.5 to 1.4–1.6 of the short circuit impedance of the welding machine.

What is claimed is:

1. A flash-butt resistance welding process comprising the steps of:

flashing parts to be welded;

upsetting parts to be welded;

changing the direction of speed of motion of said welded parts during said flashing by selectively bringing them together and spreading them apart;

measuring during flashing the total resistance of the elementary contacts created between the flashed surfaces of the parts being welded;

measuring the short circuit impedance of a welding machine used for realizing said flash-butt resistance welding process;

comparing during said flashing said total resistance of the elementary contacts with said short-circuit impedance of the welding machine;

converging said welded parts to a first moment when said total resistance of the elementary contacts reaches a value equal to 0.4–0.5 of said short-circuit impedance of the welding machine; and diverging said welded parts from said first moment to a second moment when said total resistance of the elementary contacts reaches a value equal to 1.4–1.6 of said short-circuit impedance of the welding machine.